E. L. HINCKLEY.
Steam-Radiators.

No. 135,645.  Patented Feb. 11, 1873.

Witnesses.  
S. N. Piper.  
L. N. Möller.

Enoch L. Hinckley.  
by his attorney,  
R. H. Eddy.

UNITED STATES PATENT OFFICE.

ENOCH L. HINCKLEY, OF BATH, MAINE.

IMPROVEMENT IN STEAM-RADIATORS.

Specification forming part of Letters Patent No. 135,645, dated February 11, 1873.

*To all whom it may concern:*

Be it known that I, ENOCH L. HINCKLEY, of Bath, of the county of Sagadahoc, of the State of Maine, have invented a new and useful Improvement in Heat-Radiators for warming apartments by steam; and I do hereby declare the same to be fully described in the following specification and represented in the accompanying drawing, of which—

Figure 1:
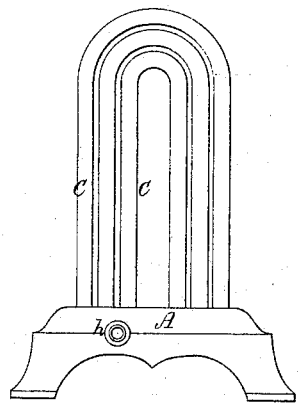
Figure 2:
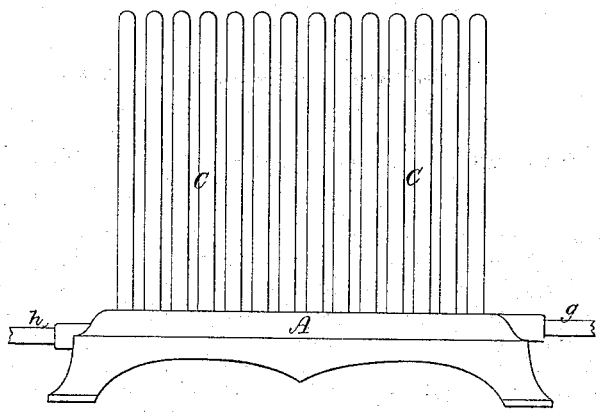
Figure 3:
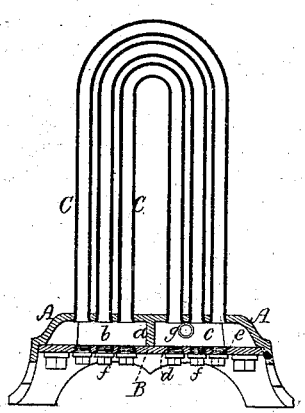
Figure 4:
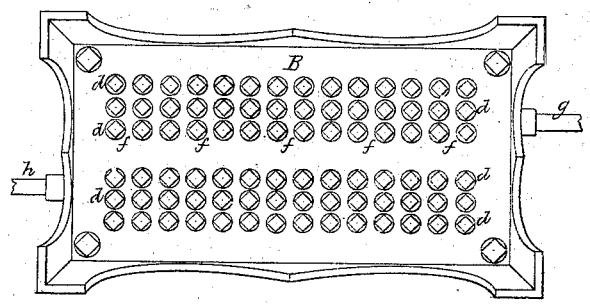

Figure 1 is an end view; Fig. 2, a side elevation; Fig. 3, a transverse section; and Fig. 4, a bottom or under-side view of a radiator containing my improvement.

In radiators having pipes or tubes extending up from a hollow or chambered base, it is frequently difficult, if not impossible, to get at the mouths of the pipes, in order, in case of leakage, to expand them at the junctions of the pipes and base. The bottom plate of the base being fixed in place by screws, its removal to get at any of the pipes necessitates the disturbance of the packing or cement of the joints of the said plate, which it is very desirable to avoid, if possible.

In carrying out my improvement I provide the bottom plate with holes through it, arranged directly opposite the mouths of the pipes. Each of such holes has a female screw to receive a screw-plug or stopper. When a pipe may leak steam at one of its joints we have only to remove the screw-plug from the hole opposite the mouth of the pipe in order to have access to the pipe. By inserting a cone or expander or proper tool into the hole and driving such tool into the mouth of the pipe the pipe about such may be expanded in the joint-hole so as to stop the leak.

In the drawing, A denotes a chambered base, provided with the separable bottom or plate B, there being a partition, *a*, extended lengthwise through the middle of the said base, so as to divide it into two apartments, *b c*. There is inserted in the top of the base one or more series of tubes, C, bent in the forms as represented, one leg of each tube opening into the apartment *b*, and the other into the apartment *c*. These tubes or pipes are inserted in holes made in the top of the base, and are subsequently expanded at their mouths so as to fix them in the holes with steam-tight joints. The bottom plate B is furnished with holes *d* going through it directly opposite the lower end of the pipes or tubes, each hole being provided with a female screw, *e*, to receive a screw-plug, *f*. Furthermore, there is an induction-pipe, *g*, leading into the end of one of the apartments *b c*, and there is also an eduction-pipe, *h*, leading out of the other apartment at its opposite end, all being as shown.

Steam, on entering one apartment, will pass therefrom up into and down through the several pipes, and thence into the other apartment, from which it will escape by the educt thereof, the steam in the meantime heating the base and the pipes, from whose outer surfaces heat will be radiated.

I claim as my invention—

The improved heat-radiator, composed of the hollow and partitioned base A, one or more series of tubes C, and the bottom plate B, provided with the screw-holes *d* and plugs *f*, all arranged and combined substantially as specified.

ENOCH L. HINCKLEY.

Witnesses:
R. H. EDDY,
J. R. SNOW.